April 1, 1958 K. T. BOULTINGHOUSE ET AL 2,828,632
TRIMMING MACHINE AND CAM MECHANISM THEREFOR
Filed Feb. 11, 1952 2 Sheets-Sheet 2
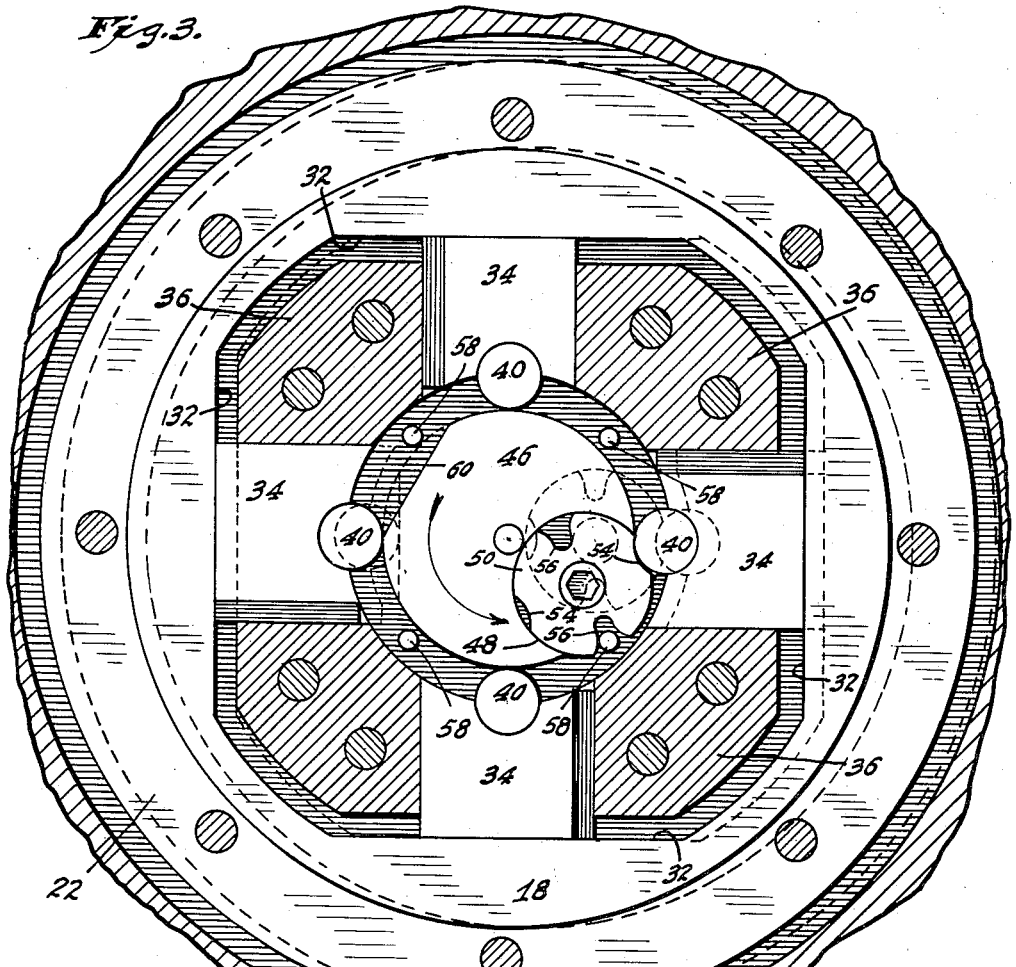
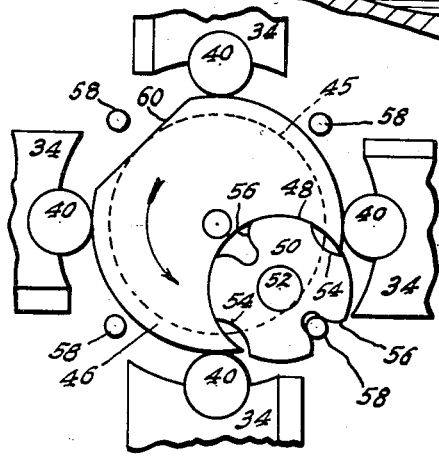
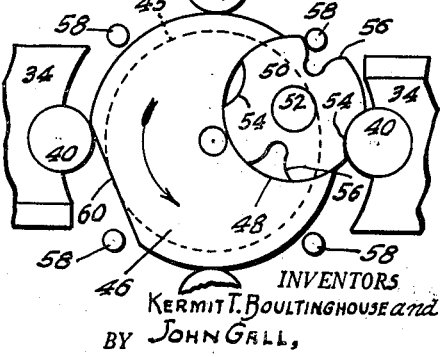
INVENTORS
KERMIT T. BOULTINGHOUSE and
BY JOHN GALL,
Schley, Trash & Jenkins
ATTORNEYS.

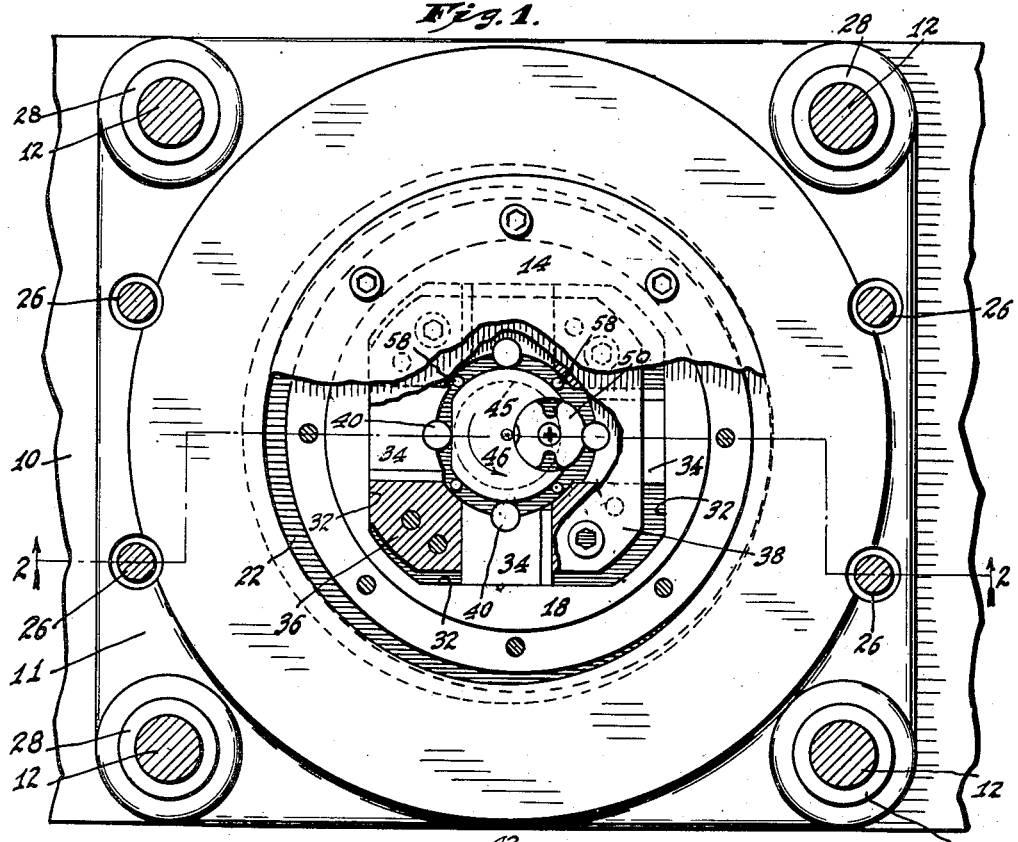

United States Patent Office 2,828,632
Patented Apr. 1, 1958

2,828,632

TRIMMING MACHINE AND CAM MECHANISM THEREFOR

Kermit T. Boultinghouse and John Gall, Columbus, Ind., assignors, by mesne assignments, to William O. Hartup, Columbus, Ind.

Application February 11, 1952, Serial No. 270,972

18 Claims. (Cl. 74—55)

This invention relates to a machine for operating upon sheet metal stampings, especially for trimming the walls of drawn parts. More particularly, it relates to a cam mechanism of special utility in such a machine, and to a machine embodying such cam mechanism.

Many sheet-metal parts, after being drawn or formed to their desired shape, then have their side walls trimmed to provide edges of a desired contour, which may be continuous edges in a flat or curved plane, or may include notches or upstanding tabs. Supplementary cutting and forming operations may also be done on the walls by providing the trimming dies with suitable parts for this purpose.

Our cam mechanism is especially advantageous in a trimming machine of the type shown in the co-pending application of William O. Hartup, Serial No. 73,326, filed January 28, 1949, now Patent No. 2,629,439, issued February 24, 1953. Trimming machines of this type have made a substantial practical advance in the art. Their usefulness, however, would be considerably extended by an operating cam mechanism which would withstand and exert greater forces and which would at the same time meet the restricted space limitations.

It is an object of our invention to provide camming mechanism which will withstand and exert greatly increased forces and which will occupy but a small space. It is an object of our invention to effect successive camming movements by a toggle action of a cam head and a rolling planetary cam block carried thereby. It is an object of our invention to provide a cam mechanism in which the force-transmitting parts engage each other over large areas to distribute the load and permit increased forces without the creation of local pressures exceeding the film strength of suitable lubricants. Other objects of our invention will appear from the following specification.

Our invention is applicable in various situations where a moving cam exerts camming actuations at particular points along its path, and it is of a special advantage in a machine of the type referred to where there are a plurality of circumferentially spaced thrust members which are engaged and actuated successively by rotating cam mechanism.

In accordance with our invention, the cam member actuates a thrust member through a cam block which is carried by the cam member and pivots on the cam member. When the cam block first engages the thrust member, it lies at an acute angle to the direction of cam movement; and as the cam movement proceeds, the cam block pivots between the cam and the thrust member, in a direction to increase its angle with respect to the direction of cam movement. The resulting action is a toggle-like action in which the pivotal movement of the cam block carries its thrust-member-engaging end in an arc with respect to the cam which includes a component of rise movement with respect to the cam. This rise component is transmitted as thrust against the thrust member.

The cam block is desirably cylindrical, and carried by the cam member in a cylindrical socket with which it makes peripheral bearing engagement. The cylindrical cam block is desirably provided with one or more cylindrical seats recessed in its periphery, and the thrust member carries a cylindrical thrust-receiving face which fits into one of such seats of the cam block during their interengagement. Thrust is thus transmitted between the parts over large bearing areas. When a plurality of thrust members are to be actuated successively, a cylindrical cam block may rotate to carry successive seats into successive actuating engagement with the successive thrust members.

With a rotating cam head, the cylindrical cam block is carried as a planet by the cam head, and may actuate several thrust members at spaced points in its path. The sum of the eccentricity of the planet on the cam head plus the eccentricity of the seats on the planet is greater than the distance from the cam head axis to each thrust member, and the difference is equivalent to the throw of the cam mechanism.

The cam member or head may carry other cam elements. In a trimming machine, for example, where the thrust members actuate a die carrier, the cam head may have a cam relief and return portion, to permit retraction and return of a thrust member, and it may have cylindrical portions to engage certain thrust members and hold them as guides for movement of the die carrier by some other thrust member.

The accompanying drawings illustrate our invention and show by way of example and not of limitation a machine embodying our invention. In such drawings, Fig. 1 is a plan view of a trimming machine embodying our invention, with parts broken away to show the cam mechanism and the thrust members it actuates; Fig. 2 is a vertical section taken on the line 2—2 of Fig. 1; Fig. 3 is an enlarged plan view of the cam mechanism, showing the thrust members upon which the cam acts and the die plate supporting ring which is actuated and controlled by those thrust members; and Figs. 4 and 5 are diagrammatic plan views of the cam mechanism showing progressive stages of its operation.

The machine shown in the drawings comprises a table 10 suitably supported as on legs at its ends and preferably reinforced strongly by heavy ribs depending from its under surface. Upon the table 10 there is mounted a bed 11 having vertical guide posts 12 at its corners. A die plate 14 is mounted on the table 10 within the bed 11 and carries the lower trimming die 20. A cross head 25 vertically movable on the guide posts 12 carries the upper trimming die 30. Such die 30 has a work-receiving opening, in the bottom of which there is a knock-out block 41 carried by a bar 42 and yieldingly held upward but vertically movable downward in the cross head 25 to expel the work from the upper trimming die at the end of a trimming cycle. The cross head 25 is connected by rods 26 to suitable operating mechanism so that the cross head 25 may be elevated to open the dies for loading and lowered to bring the dies to proper working relation. The limit of lowering may be determined by stop sleeves 28 on the guide posts 12.

The die plate 14 is mounted within a circular opening in the bed 11 and desirably has a rim 16 which overlies the edges of that opening. It is removably secured to an annular carrier 18 which slides on the surface of the table 10 and is provided with a lower rim 22 which slides under a shoulder 23 on the bed 11.

The inner surface of the annular carrier 18 forms four planar guiding thrust faces 32 which are perpendicular to the surface of the table 10 and to radii from a central vertical axis. The four faces 32 are abutted respectively by four guiding thrust members 34 which slide on the table and are held to radial movement by guide blocks 36. A plate 38 overlies the four guiding thrust members 34, beneath the die plate 14, and is fixed on the four guide blocks 36. A stud 37 mounted on the fixed plate 38 extends up through central openings in the die plate 14 and die 20 to support a holder 39 for the work piece on top of the die 20.

The inner ends of the four guiding thrust members 34 are each formed with a vertical cylindrical slot to receive and hold a thrust roll 40, which desirably has a bearing fit in the guiding thrust member 34 so that it may turn therein to prevent localization of wear.

The heavy main shaft 45 is journaled in a bearing 44 in the table 10, and has an enlarged cam head 46 at its upper end, which bears against the top of the bearing 44 and is positioned in the plane of the thrust rolls 40.

At one side, the cam head is bored to form a cylindrical socket 48 eccentric to the axis of the cam head and opening through the periphery of that cam head. This socket 48 receives a cylindrical disk-like rolling cam block 50 which makes peripheral bearing engagement with the walls of the socket 48. The block 50 may be retained in the socket 48 by a retaining bolt 52. At two diametrically opposite points the rolling cam block 50 is provided with shallow cylindrical recesses 54 having concave surfaces adapted to mate with the thrust rolls 40 and to engage them over a considerable area.

To position the rolling cam block for proper engagement with each successive thrust roll 40, it desirably interengages positioning mechanism in its travel between the successive thrust rolls 40. As shown in the drawing, this positioning is obtained by a Geneva-like mechanism. Midway between the recesses 54, at each side of the rolling cam block 50, that block 50 is provided with a shaped notch 56; and pins 58 are fixed in the pathway of the block 50 between each pair of thrust rolls 40. As the block 50 leaves engagement with each thrust roll 40 a notch 56 in the block 50 comes into engagement with a pin 58, and as the cam head continues to rotate, the pin 58 causes the block 50 to rotate to an approach position, shown in full lines in Fig. 3, where its forwardly presented recess 54 is in position to make mating engagement with the surface of the next thrust roll 40.

Diametrically opposite from the rolling cam block 50, the cam head is provided with a relief and re-centering cam portion 60, to permit retraction of the thrust member 34 opposite to that acted on by the rolling cam block 50, and subsequently to move that retracted member outward to recenter the die carrier.

Between the cam-block receiving socket 48 and the cam portion 60, the outer surfaces of the cam head 46 are cylindrical and of a diameter which will engage the thrust rolls 40 to hold the guiding thrust members 34 in guiding relationship with the planar thrust faces 32 of the carrier 18.

The shaft 45 and the cam head 46 as shown in Fig. 3 rotate counter-clockwise during successive cycles of operation, and under such circumstances wear on the thrust members 34 occurs largely on their counter-clockwise sides, and these sides are desirably provided with removable wear plates 35. Access to these wear-taking parts and to the thrust rolls 40 and the cam mechanism 46—50 is readily obtained by removal of the die plate 14 from the carrier 18 and removal of the plate 38 from the guide blocks 36.

The main shaft 45 extends downward below the table 10 and its lower reduced end is journalled in a support 7. The shaft 45 is driven through a one-revolution clutch by a worm ring gear driven from a driving shaft 64 journalled in the reinforcing ribs of the table 10. The driving clutch-member 66 is rotatable on the shaft 45, is supported from the wall 7 by a thrust bearing, and carries the worm ring gear 68. A worm 65 on the shaft 64, supported by thrust bearings against the reinforcing ribs of the table 10, meshes with the ring gear 68 and drives the clutch member 66. The shaft 65 is driven in any suitable way at a constant speed.

The driven clutch-member is formed by the shaft 45 itself. To this end, a ring 70 is keyed to the main body of the shaft 45 immediately above the clutch member 66, and a clutch key 72 is carried by, and axially movable in, opposed key ways in the shaft 45 and ring 70. A spring 73 urges the key 72 downward for engagement with the clutch member 66, and the inner upper edge of that clutch member 66 is provided with one or more notches 76 to receive the clutch key 72. The upper end of the key 72 is provided with a hook 74, and a manually operable cam 78 normally lies in the path of such hook 74 to cam that key 72 upward to de-clutched position. The cam 78 carries a suitable handle by which it may be retracted radially from the shaft 45 to release the key 72 and permit the spring 73 to move that key to clutching engagement in a notch 76 of the clutch member 66.

To prepare the trimmer for use, a lower die 20 is mounted on the die plate 14 to move therewith. A stationary filler block or work holder 39 shaped to conform to the work piece 80 to be trimmed is mounted above the lower die 20 on the stud 37. The upper cross head 25 is fitted with a suitable mating die 30 adapted to receive the work piece 80 and to be brought into shearing relationship with the lower die 20, and a suitable knock-out block 41 is mounted on the bar 42 within the upper die 30.

The driving motor for the shaft 64 is started, and operates continuously, to continuously rotate the lower clutch member 66. The clutch operating cam 78, being normally in engagement with the hook 74 of the clutch key 72, holds it in elevated position so that the clutch is disengaged.

The normal at-rest position of the shaft 45 is at a point such as that shown in Fig. 5 where its rolling cam block 50 and its re-centering portion 60 lie between the thrust rolls 40 and where all of those thrust rolls 40 engage the cylindrical surfaces of the cam head 46, which positions the die plate 14 in central position. With the die plate and its lower die 20 in such central position, and with the upper cross head 25 raised, a workpiece 80 to be trimmed is loaded by placing it in inverted position over the work holder 39 and the lower die 20.

The cross head 25 and the upper die 30 are then lowered, bringing the cross head firmly against the stop sleeves 28 and the upper die 30 into proper shearing relationship with the lower die 20. The clutch cam 78 is then operated to retract the clutch key 72 and release that key for engagement with one of the notches 76, to effect clutch-engagement for one revolution of the shaft 45.

As the cam head 46 rotates from the at-rest position shown in Fig. 5 to carry the rolling cam block 50 toward the first thrust roll 40 in its path, the engagement of the notch 56 with the pin 58 rotates the cam block 50 from the relative position shown in Fig. 5 to the relative position shown in full lines in Fig. 3 where the forward recess 54 on the cam block is in position to make mating engagement with the next thrust roll 40.

As the parts reach this position, they lie in a toggle arrangement. That is, the line adjoining the cam shaft 45 axis with the cam block 50 axis lies at a wide angle to the line joining the cam block 50 axis and the thrust roll 40 axis, with the parts in such position that as this angle is widened thrust is exerted between the cam shaft 45 axis and the thrust roll 40 axis. As the cam head 46 continues to rotate from the full-line position shown in Fig. 3, a strong thrust is thus exerted on the thrust roll 40 in engagement with the cam block 50 and on the associated thrust member 34. Simultaneously, the opposite thrust roll 40 enters the relief and re-centering portion 60 of the cam head 46 and permits its associated thrust member 34 to retract. These parts are thus moved from their full-line positions in Fig. 3 to their dotted-line positions in that figure, and the die-plate carrier 18 is moved to the right through a die operating stroke in that direction.

As the cam head 46 continues to rotate, the cam block 50 rolls about the engaged thrust roll 40 toward and to the relative position shown in Fig. 4, where the forward notch 56 of the cam block 50 engages the next positioning pin 58. Upon further rotation, the next positioning pin 58 rotates the cam block 50 in its socket, to a relative position like that in Fig. 5. Meanwhile, the re-centering portion of the cam head 46 pushes the left-hand thrust roll 40 outward to re-center the actuated thrust members 34 and to re-center the die plate carrier 18.

The rolling cam block 50 has now been rotated 180 degrees with respect to the cam head, during the 90 degree movement of the cam head, and the second recess 54 is now forward, to be presented to the next thrust roll 40. Except for this alternate use of the two recesses 54, the successive quarter-cycle camming operations of the successive thrust rolls is similar to the quarter-cycle operation described above.

During each full one-revolution cycle, the rolling cam block 50 is moved stepwise into successive actuating engagement with each of the four thrust rolls 40, to cam its associated thrust member 34 outward and move the die plate carrier 18 and the lower die 20 through a shearing stroke in the direction of each of the four thrust members 34. The rolling cam block 50 is thus carried as a planet by the cam head 46 successively into a toggle relationship with each of the four thrust rolls 40, and each of those rolls 40 is thrust outward by a toggle action.

In these thrust operations, the load carrying parts are in engagement over large areas. The cam shaft 45 is firmly supported by its bearing in the table 10 and the thrust reaction on it occurs close to that firm support. The rolling cam block 50 is in bearing engagement over a major portion of its peripheral surface with the walls of its socket 48. The block 50 engages the thrust roll 40 over a considerable portion of its cylindrical surface, and that thrust roll 40 is in engagement with its thrust member 34 over substantially half of its cylindrical surface. The thrust is thus transmitted between faces which are in engagement over large and mutually mating areas and which can therefore carry and transmit large loads without creating excessive unit pressures.

Upon completion of the one-revolution cycle, in which the four thrust members 34 are successively actuated in outward radial directions, the one revolution clutch mechanism disengages the clutch and brings the parts to rest at a position such as that in Fig. 5, where the thrust rolls 40 are all in engagement with cylindrical surfaces of the cam head 46, and the die plate carrier 18 and the lower die 20 are centered. The dies can then be opened, the trimmed workpiece removed, and a new workpiece inserted for a subsequent operation.

We claim as our invention:

1. Cam mechanism, comprising a movable cam, a thrust member movable transversely of said cam, a cylindrical thrust-receiving face on said thrust member presented toward said cam, a cam block carried by said cam, a seat on said cam block formed to mate with said face, said cam block having a position in which it lies at an acute angle to the direction of movement of said cam with its said seat presented forwardly to make mating engagement with said thrust-receiving face, means to so position said block as said cam approaches operative relation with said thrust member, said block moving pivotally outward with respect to said cam and pivoting about said face as said cam advances beyond the point of engagement of said seat with said face, whereby the outward component of pivotal movement of said seat with respect to said cam forces said thrust member outward from said cam.

2. Cam mechanism, comprising a movable cam, a cam block pivotally carried thereby and having an outwardly-presented eccentric seat, said cam block being pivotally movable with respect to said cam to carry said seat in an arc having a component of rise movement with respect to said cam, a thrust-member movable transversely of said cam, a thrust-receiving face formed to make thrust-transmitting engagement with said seat and positioned to be engaged by said seat at the base of the rise movement thereof as said cam is advanced, further advance movement of said cam causing said cam block to pivot with respect to said cam and about said face to transmit said rise component of seat movement as thrust movement of said thrust member.

3. Cam mechanism, comprising a movable cam, a cylindrical socket formed in said cam on an axis normal to the direction of cam movement, said socket being open over a portion of its periphery through a face of said cam, a cam block rotatably received in said socket with a portion thereof projecting outwardly beyond said face, a concave seat in the periphery of said cam block, said block having an engagement position presenting said seat at the forward part of its projecting portion, a thrust member movable transversely of said cam, a thrust-receiving convex face on said thrust member formed and positioned to engage the so-presented seat in mating concavo-convex bearing relationship, advance movement of said cam from its thrust-member engaging position causing said cam block to pivot on said thrust-receiving face and rotate in its socket to transmit an outward component of revolution of its seat as thrust movement against said thrust member.

4. Cam mechanism, comprising a movable cam, a cylindrical socket therein open over a portion of its periphery through a face of said cam, a rotatable cam block received in bearing engagement in said socket and projecting outward from said face, a thrust-transmitting seat in the periphery of said block and normally presented adjacent said cam face, a movable thrust member having a thrust-receiving face formed to make pivotal bearing engagement with said seat, said thrust member being positioned to present its said face for engagement in said seat and adapted to be actuated in its direction of thrust by a force component derived from the movement of said seat as the cam block is rotated within said cam during the rotation of the latter.

5. Cam mechanism, comprising a rotatable cam, a cam block eccentrically pivoted thereon, said cam block having an outwardly presented thrust-transmitting seat movable therewith in an arcuate path having a component of rise movement with respect to said cam, a thrust member movable outwardly from said cam, a thrust-receiving face thereon formed to make pivotal bearing engagement with said seat at the base of the rise movement thereof, subsequent movement of the cam causing said cam block to pivot between the cam and the thrust member to transmit to the latter the rise movement of the seat with respect to the cam.

6. Cam mechanism, comprising a rotatable cam, an eccentric cylindrical socket therein open over a portion of its periphery through the periphery of said cam, a rotatable cam block received in bearing engagement in said socket and projecting outward from the periphery of said cam, a thrust transmitting seat in the periphery of said cam block, a movable thrust member movable outward from said cam and having a thrust-receiving face formed and presented to make pivotal bearing engagement with said thrust-transmitting seat, said cam block being positioned and adapted to engage its seat against said face and thereafter to transmit an outward thrust against the same by rotation of the cam block in said cam during rotation of the latter.

7. Cam mechanism, comprising a rotatable cam, a plurality of thrust members positioned to be actuated by said cam at angularly spaced points thereabout, thrust-receiving faces on said members similarly presented toward said cam, a cam block pivoted eccentrically on said cam, said cam block having an outwardly presented seat movable therewith in an arcuate path having a component of rise movement with respect to said cam, said seat and faces being formed with inter-fitting engagement surfaces, said block having an approach position in which said seat lies in a leading position in the direction of cam rotation to engage the thrust-receiving face of a thrust member for actuation thereof by said component of rise movement, and means to position said cam block in said approach position.

8. Cam mechanism, comprising a rotatable cam, an eccentric cylindrical socket therein open over a portion of its periphery through the periphery of said cam, a rotatable cam block received in bearing engagement in said socket and projecting outward from the periphery of said cam, a plurality of thrust transmitting concave seats in the periphery of said cam block and arranged to be successively presented forward for engagement with thrust-members, a plurality of movable thrust members having convex seat-engaging faces, said members being spaced about said cam and positioned to be engaged on said faces by said seats and to be actuated outward from said cam by transmission thereto of outward components of the motion through which said seats are carried by rotation of said cam block in said socket.

9. Cam mechanism as defined in claim 8 with the addition of means cooperating with said cam block in its travel from one thrust member to the next and acting to position a seat on said cam block for engagement with the thrust face of said next thrust member.

10. Cam mechanism, comprising a rotatable cam, an eccentric cylindrical socket therein open over a portion of its periphery through the periphery of said cam, a rotatable cam block received in bearing engagement in said socket and projecting outward from the periphery of said cam, a plurality of thrust-transmitting seats in the periphery of said cam block, a plurality of movable thrust members spaced about said cam and adapted to be engaged by said cam-block seats, said seats and members having inter-fitting engagement surfaces, said thrust members and cam block cooperating during rotation of said cam to cause rotation of said cam block in its socket and thrust actuation of said thrust members by said cam block, and means to interengage said cam block as it approaches each thrust member to guide it into cooperative relation therewith.

11. Cam mechanism, comprising a rotatable cam, an eccentric cylindrical socket therein open over a portion of its periphery through the periphery of said cam, a rotatable cam block received in bearing engagement in said socket and projecting outward from the periphery of said cam, a plurality of thrust-transmitting seats spaced about the periphery of said cam block, a plurality of movable thrust members spaced about said cam and adapted to be engaged by said seats and actuated by said cam block, said seats and members having inter-fitting meshing engagement surfaces, guide teeth positioned between said thrust members, notches in said cam block between said seats for engagement with said guide teeth, said cam block being rotated in its socket by said notch engagement to roll said thrust transmitting seats into successive engagements with said thrust members.

12. In a machine having a carrier to be translated through a cycle of radial strokes from a common central axis, a plurality of radially movable thrust members in thrust transmitting relation with said carrier, a central cam head rotatable on said axis, a planetary cam block carried by said cam head, thrust transmitting seats on said cam block arranged to engage said thrust members successively, said seats and thrust members having inter-fitting meshing engagement surfaces, the planetary movement of said cam block causing said seats to move in engagement with said thrust members through outward components of motion and thereby actuate said thrust members successively through radial thrust strokes against said carrier.

13. In a machine having a carrier to be translated through a cycle of radial strokes from a common central axis, a plurality of radially movable thrust members in thrust transmitting relation with said carrier, convex cylindrical thrust-receiving faces presented inwardly by said thrust members, a cam head rotatable on said axis, an eccentric cylindrical socket in said cam head open over a portion of its periphery through the periphery of said cam head, a planetary cam block seated in said socket and having peripheral bearing engagement therewith, thrust transmitting concave seats in the periphery of said cam block adapted to make inter-fitting bearing engagement with the thrust-receiving faces of said thrust members, the planetary movement of said cam block causing said seats to move in such engagement with said thrust members through outward components of motion and thereby actuate said thrust members successively through radial thrust strokes to move said carrier.

14. In a machine having a carrier to be translated through a cycle of radial strokes from a common central axis, a plurality of radially movable thrust members in thrust transmitting relation with said carrier, inwardly presented cylindrical thrust-receiving faces on said thrust members, a central cam head, a rotatable cam block carried eccentrically by said cam head, outwardly presented cylindrical thrust-transmitting seats carried eccentrically by said cam block to inter-fit with said faces of said thrust members, the sum of the eccentricity of the cam block on the cam head and the eccentricity of the seats on the cam block being greater than the distance from the cam head axis to the centers of said thrust-member faces, whereby engagement of a cam-block seat with a thrust-member face brings the cam head and cam block and thrust member into toggle relationship, said cam block being carried successively into such toggle relationship with successive thrust members and through toggle actuation thereof.

15. In a trimming machine having a die carrier to be translated through a cycle of four radial strokes at right angles to each other and in which the die carrier is centered and actuated by four rectangularly disposed guiding thrust members each presenting inwardly a cylindrical thrust-receiving face, cam mechanism, comprising a cam head rotatable about a central axis and having cylindrical outer surfaces to engage said faces and center said thrust members, a cylindrical cam-block-receiving socket in said cam head, a cam block rotatably carried in said socket eccentrically of said cam head, cylindrical thrust-transmitting seats carried eccentrically by said cam block and adapted to engage the thrust receiving faces of said thrust members, the sum of the eccentricity of said cam block on said head and the eccentricity of said seats in said cam block being greater than the distance from the cam head axis to the center of said thrust-member faces, means to position said cam block for successive engagements of its seats with successive thrust member faces, and means to drive said cam head through one-revolution cycles.

16. In a trimming machine having a die carrier to be translated through a cycle of four radial strokes at right angles to each other and in which the die carrier is centered and actuated by four rectangularly disposed guiding thrust members each presenting inwardly a cylindrical thrust-receiving face, cam mechanism, comprising a cam head rotatable about a central axis and having cylindrical outer surfaces to engage said faces and center said thrust members, a planetary cam block carried by said cam head, and cylindrical thrust-transmitting seats in said cam block adapted to intermesh with said thrust-receiving faces as said planetary cam block is revolved by said cam head, the movement of an engaged seat during such engagement including a component of rise with respect to said cam.

17. In a trimming machine having a die carrier to be translated through a cycle of four radial strokes at right angles to each other and in which the die carrier is centered and actuated by four rectangularly disposed guiding thrust members each presenting inwardly a cylindrical thrust-receiving face, cam mechanism, comprising a cam head rotatable about a central axis and having cylindrical outer surfaces to engage said faces and center said thrust members, a planetary cam block carried by said cam head, cylindrical thrust-transmitting seats in said cam block adapted to intermesh with said thrust-receiving faces as said planetary cam block is revolved by said cam head, the movement of an engaged seat during such engagement including a component of rise with respect to said cam head, and means operative during cam block travel from one thrust member to the next to position a successive seat for meshing engagement with said next thrust member.

18. In a trimming machine having a die carrier to be translated through a cycle of four radial strokes at right angles to each other and in which the die carrier is centered and actuated by four rectangularly disposed guiding thrust members each presenting inwardly a cylindrical thrust-receiving face, cam mechanism, comprising a cam head rotatable about a central axis and having cylindrical outer surfaces to engage said faces and center said thrust members, a planetary cam block carried by said cam head, cylindrical thrust-transmitting seats in said cam block adapted to intermesh with said thrust-receiving faces as said planetary cam block is revolved by said cam head, the movement of an engaged seat during such engagement including a component of rise with respect to said cam head, recesses in said cam block spaced circumferentially between said seats, and fixed means between said thrust members to interengage said recesses and rotate said cam block into meshing engagement with successive thrust-members.

References Cited in the file of this patent
UNITED STATES PATENTS

| | | |
|---|---|---|
| 1,717,612 | McNeil | June 18, 1929 |
| 1,965,228 | Gabriel | July 3, 1934 |
| 2,224,905 | Franz | Dec. 17, 1940 |
| 2,363,407 | Foster | Nov. 21, 1944 |
| 2,413,980 | Liss | Jan. 7, 1947 |
| 2,521,974 | Hartup | Sept. 12, 1950 |
| 2,629,439 | Hartup | Feb. 24, 1953 |